United States Patent
Goyal et al.

(10) Patent No.: US 7,715,444 B2
(45) Date of Patent: May 11, 2010

(54) RESUMING A PREVIOUSLY INTERRUPTED PEER-TO-PEER SYNCHRONIZATION OPERATION

(75) Inventors: Sidd Goyal, Boston, MA (US); Mikhail Ryleev, San Jose, CA (US)

(73) Assignee: Palm, Inc, Sunnyvale, CA (US)

( * ) Notice: Subject to any disclaimer, the term of this patent is extended or adjusted under 35 U.S.C. 154(b) by 471 days.

(21) Appl. No.: 11/670,949

(22) Filed: Feb. 2, 2007

(65) Prior Publication Data

US 2008/0187007 A1 Aug. 7, 2008

(51) Int. Cl.
  *H04J 3/06* (2006.01)
  *H04B 1/56* (2006.01)
  *G06F 15/16* (2006.01)
(52) U.S. Cl. .................. 370/507; 370/216; 709/248
(58) Field of Classification Search ................ 370/216, 370/252, 503, 507, 509–510, 513, 516, 519; 709/248
See application file for complete search history.

(56) References Cited

U.S. PATENT DOCUMENTS

| | | | |
|---|---|---|---|
| 5,235,597 A * | 8/1993 | Himwich et al. ............ 370/469 |
| 5,870,680 A | 2/1999 | Guerlin et al. | |
| 5,884,323 A | 3/1999 | Hawkins et al. | |
| 6,000,000 A | 12/1999 | Hawkins et al. | |
| 6,006,274 A | 12/1999 | Hawkins et al. | |
| 6,230,210 B1 * | 5/2001 | Davies et al. ............... 709/248 |
| 6,298,054 B1 * | 10/2001 | Dorenbosch et al. ........ 370/350 |
| 6,304,582 B1 * | 10/2001 | Zhang et al. ................ 370/503 |
| 6,311,209 B1 | 10/2001 | Olson et al. | |
| 6,330,618 B1 | 12/2001 | Hawkins et al. | |
| 6,728,786 B2 | 4/2004 | Hawkins et al. | |
| 6,810,405 B1 * | 10/2004 | LaRue et al. ................ 707/201 |
| 6,865,240 B1 * | 3/2005 | Kawataka .................... 375/368 |
| 6,999,792 B2 | 2/2006 | Warren | |

(Continued)

FOREIGN PATENT DOCUMENTS

EP 1 215 575 6/2002

(Continued)

OTHER PUBLICATIONS

SyncML Sync Protocol, version 1.1, Feb. 15, 2002, 62 pages.

(Continued)

*Primary Examiner*—Chi H Pham
*Assistant Examiner*—Warner Wong
(74) *Attorney, Agent, or Firm*—Fish & Richardson P.C.

(57) ABSTRACT

A method of synchronizing data between two devices can include starting, in a first device, a first synchronization operation comprising transmitting a first data set to be received by a second device, the first data set comprising changes to multiple different data elements in the first device that have occurred since a prior successful synchronization operation between the first device and the second device; receiving at least one of separate acknowledgements for each of the multiple different data elements, each such acknowledgement indicating that a change to one of the multiple different data elements in the first device has been applied to a corresponding data element in the second device; and when the first synchronization operation is interrupted, initiating a second synchronization operation to synchronize the changes of the first data set for which a separate acknowledgement was not received during the first synchronization operation.

1 Claim, 6 Drawing Sheets

U.S. PATENT DOCUMENTS

| | | | |
|---|---|---|---|
| 7,032,033 B1* | 4/2006 | Ledoux et al. | 709/248 |
| 7,623,551 B2* | 11/2009 | Auriemma et al. | 370/503 |
| 2002/0073139 A1 | 6/2002 | Hawkins et al. | |
| 2002/0151283 A1 | 10/2002 | Pallakoff | |
| 2002/0174372 A1* | 11/2002 | Venkataraman | 713/400 |
| 2003/0081557 A1* | 5/2003 | Mettala et al. | 370/252 |
| 2004/0006551 A1 | 1/2004 | Sahinoja et al. | |
| 2004/0024910 A1* | 2/2004 | Marl et al. | 709/248 |
| 2004/0205263 A1* | 10/2004 | Sivaraman et al. | 710/21 |
| 2006/0069809 A1* | 3/2006 | Serlet | 709/248 |
| 2006/0242278 A1 | 10/2006 | Hawkins et al. | |
| 2007/0014314 A1* | 1/2007 | O'Neil | 370/503 |
| 2009/0116496 A1* | 5/2009 | Savage et al. | 370/400 |

FOREIGN PATENT DOCUMENTS

| | | |
|---|---|---|
| EP | 1 330 098 | 7/2003 |
| WO | WO 99/26159 | 5/1999 |

OTHER PUBLICATIONS

SyncML Sync Representation Protocol, Data Synchronization Usage, version 1.1, Feb. 15, 2002, 66 pages.

"Microsoft Support WebCast Troublshooting Microsoft Exchange Server 2003 ActiveSunc Issues Mar. 25, 2004", available at http://support.microsoft.com/default.aspx?scid=%2Fservicedesks%2F webcasts%2Fen%2Ftranscripts%2Fwct032504.asp, 21 pages.

"Windows Registry & PC Fix" available at http://hardware.mcse.ms/archive35-3005-7-211982.html Jul. 13, 2005, 8 pages.

Cohen, N. H., 'A Java Framework for Mobile Data Synchronization', *Cooperative Information Systems: 7th International Conference CoopIS 2000*; Eilat, Israel, Sep. 2000; Proceedings, Lectures Notes in Computer Science 1901, Springer-Verlag, Berlin, 2000, 287-298, 12 pages.

"Go to my pc from anywhere with BeInSync" available at http://www.beinsync.faq.php, last accessed Jan. 22, 2007, 20 pages.

SyncML White Paper, "Building an Industry-Wide Mobile Data Synchronization Protocol" available at http://xml.coverpages.org/SyncML-WhitePaper.pdf, last accessed Nov. 27, 2006, 14 pages.

\* cited by examiner

RESUMING A PREVIOUSLY INTERRUPTED PEER-TO-PEER SYNCHRONIZATION OPERATION

TECHNICAL FIELD

The disclosed implementations relate generally to synchronizing information between various devices. In particular, the disclosed implementations relate to resuming a previously interrupted peer-to-peer synchronization operation between two devices.

BACKGROUND

People use various devices to manage different kinds of information. For example, a person may use a desktop computer at his or her office to send and receive emails, manage a calendar, maintain personal and business contacts, and process various electronic documents and files. The person may also use a laptop computer while traveling to manage the same kinds of information. The person may also carry a personal digital assistant (PDA) to maintain a portable calendar. The person may also carry a cell phone or a smartphone to send and receive cellular calls. In some cases, the cell phone or smartphone includes PDA functionality and also provides access to office emails, calendar items and contact information. In such cases, the person may also use with the cell phone or smartphone an accessory I/O device that has a larger screen and keypad to more efficiently input data into or display data from the cell phone or smartphone.

To be most useful, each of the information-managing devices a person employs should provide access to the same version of information. To enable access to the same version of information from different devices, information can be synchronized between the different devices. For example, emails on a desktop computer can be synchronized with emails on a smartphone so that a person can read or respond to the same emails from either the desktop computer or the smartphone. As another example, calendar items on a PDA can be synchronized with calendar items on the desktop computer so that a user can determine his or her appointments and meetings by consulting either the desktop computer or the PDA.

Frequently, synchronization is managed with respect to a central repository. For example, the desktop computer at a person's office may connect to an enterprise server that maintains a central copy of emails and calendar items. To synchronize calendar items between the desktop computer and the PDA, the PDA may connect to the enterprise server. Similarly, to synchronize emails between the desktop computer and a smartphone, the smartphone may connect to the enterprise server.

A synchronization operation between two devices is sometimes interrupted for a variety of reasons. For example, the synchronization operation may be manually aborted by a user of one of the devices. As another example, one of the devices may lose power, causing the device to unexpectedly shut down. As another example, a connection between two devices being synchronized may be lost or subjected to interference. In particular, for example, a cellular connection between a smartphone and an enterprise server may be dropped, or the smartphone may be moved out of range of cellular coverage. When a synchronization operation between two devices is interrupted, there are different ways to recover, in order to enable information to ultimately be synchronized between the two devices.

SUMMARY

In some implementations, a method of synchronizing data between two devices includes starting, in a first device, a first synchronization operation comprising transmitting a first data set to be received by a second device, the first data set comprising changes to multiple different data elements in the first device that have occurred since a prior successful synchronization operation between the first device and the second device. The method can further include receiving, during the first synchronization operation, at least one of separate acknowledgements for each of the multiple different data elements, each such acknowledgement indicating that a change to one of the multiple different data elements in the first device has been applied to a corresponding data element in the second device. When the first synchronization operation is interrupted and a separate acknowledgment has not been received for each of the multiple different data elements, the method can include initiating a second synchronization operation comprising transmitting a second data set to be received by the second device, the second data set comprising the changes to the multiple different data elements of the first data set for which a separate acknowledgement was not received during the first synchronization operation.

In some implementations, a method of synchronizing data between two devices can include determining whether a prior synchronization operation between a first device and a second device was successful based on a value of one or more indicators in the first device. If the prior synchronization operation was successful, the method can include identifying a first data set comprising changes to multiple different data elements in the first device that have occurred since the prior synchronization operation. If the prior synchronization operation was not successful, the method can include identifying a second data set comprising changes to multiple different data elements in the first device that have occurred since an earlier successful synchronization operation for which separate acknowledgements were not received during the prior synchronization operation. The method can further include sending the changes in the first or second data set to the second device; receiving one or more separate acknowledgments from the second device, each separate acknowledgement indicating that the second device successfully applied a specific change in the first or second data set; and when an acknowledgment has been received for each of the changes in the first or second data set, modifying the one or more indicators to indicate that the current synchronization operation has completed successfully.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
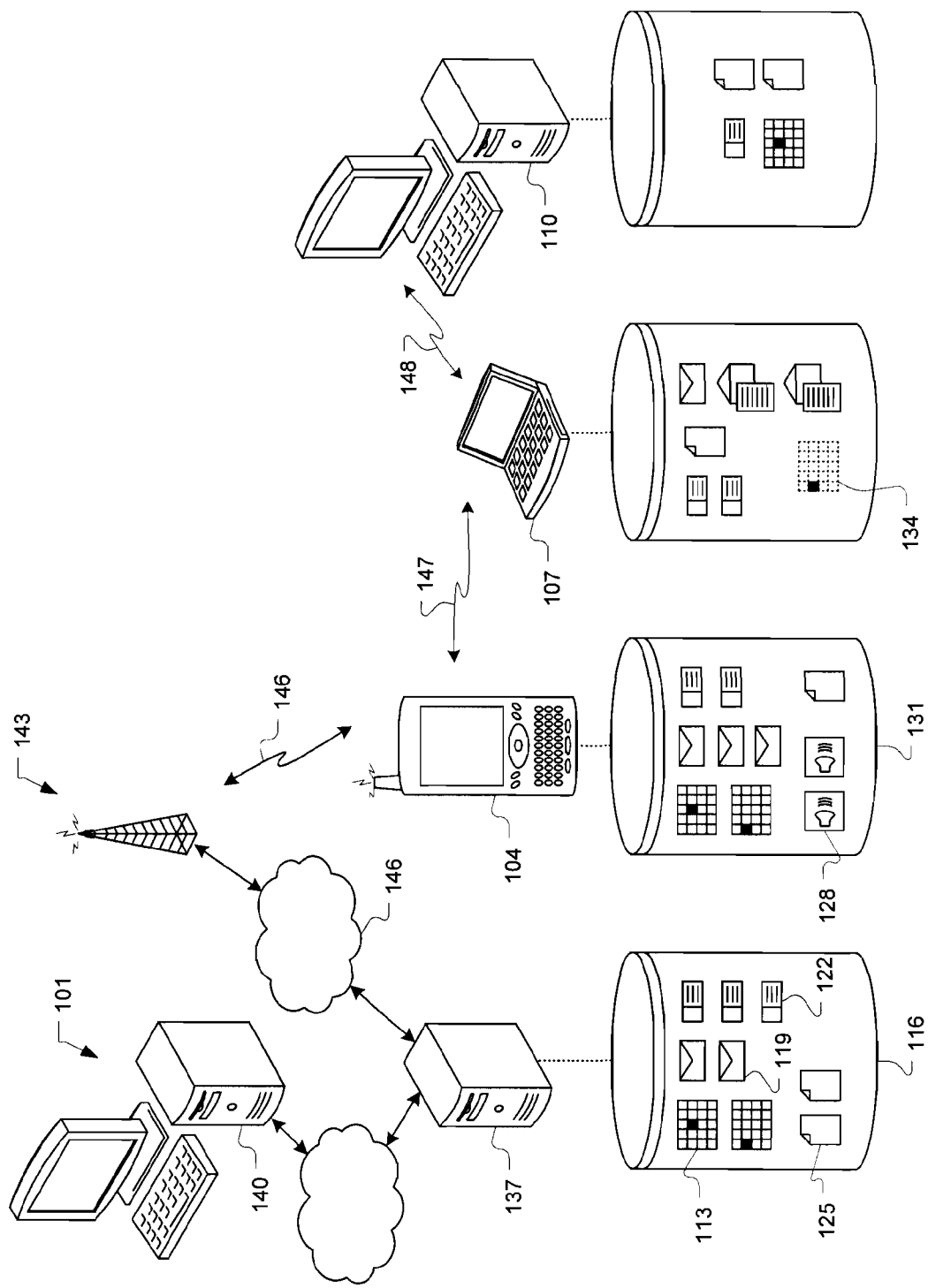
FIG. 1 is a block diagram illustrating example devices that can each process information, which can be synchronized with information in other devices.

Several example devices that a user can employ to process various kinds of information are depicted in FIG. 1 and include an enterprise computing system 101, a smartphone 104, an accessory input/output (I/O) device 107, and a stand-alone computing device 110. In some implementations, each of the above-described electronic devices runs one or more applications (e.g., software programs) to allow the user to manage particular kinds of information (e.g., data elements). Not all devices necessarily process all kinds of data elements. For example, the enterprise computer system 101 can be configured to process calendar data elements (e.g., including a calendar data element 113, depicted in a data store 116 associated with the enterprise computing system 101), email message data elements (e.g., including an email message data element 119), contact data elements (e.g., including a contact data element 122) and document data elements (e.g., including a document data element 125). As another example, the smartphone 104 and stand-alone computing device 110 can be configured to process many of the same data elements, and in addition, the smartphone 104 can be configured to process voicemail data elements (e.g., including a voicemail data element 128, depicted in a data store 131 associated with the smartphone 104).

To enable a user to process the same underlying information (e.g., information embodied in specific data elements), the information can be synchronized between devices. Synchronizing data elements between two different devices can include, for example, initially creating data elements in a first device that correspond to data elements a second device. In particular, for example, with reference to a first device having no contact data elements and a second device having three contact data elements, synchronization can include creating three contact data elements in the first device that correspond to the three contact data elements in the second device. Correspondence can include storing the same underlying information, even if the exact format in which the data is stored is different between the devices. For example, contact data elements in the first device (e.g., an enterprise computing system) could be stored as Microsoft Outlook Contacts and the corresponding data elements in the second device (e.g., a Palm® Treo™) could be stored as Palm Desktop address records or business card records. In this example, even though the exact format of the data elements is different in each device, the same underlying data (e.g., name, address and contact information for different people or organizations) can be the same.

As another example, synchronization can include making corresponding data elements that have been previously synchronized between two different devices match (i.e., making similar copies of the data elements in each device). In some implementations, two different copies of a data element are similar, and the copies match, when the two different copies store the same underlying information. If the underlying information stored by the first of the two different copies changes (e.g., a data element is created, modified or deleted), then to synchronize the two different copies, the changes to the first copy are, in some implementations, applied to the second copy, such that following the synchronization, the two copies again store the same underlying data. In some implementations, only some data elements may be synchronized between devices. For example, a synchronization operation between two devices that store both email message data elements and contact data elements can be configured to include synchronization of only email message data elements, even if contact data elements have changed in either or both of the devices.

A synchronization operation can include two phases. For example, in a first phase changes to data elements in a first device can be provided by the first device, to the second device, for application to corresponding data elements in the second device; in a second phase, changes to data elements in the second device can be provided by the second device, to the first device, for application to corresponding data elements in the first device. For purposes of explanation, various synchronization operations are described with reference to one device, but the reader will appreciate that the described synchronization operations can be performed in either or both of a device that is initiating the synchronization operation and a device that is responding to a synchronization operation that has been initiated by another device.

In implementations in which some data elements have changed in one device, and other data elements have changed in the second device, synchronization can include synchronizing changes to data elements in the first device, then synchronizing changes to data elements in the second device. In some implementations, corresponding data elements that have been changed in both devices can be handled separately from changes that have been made to only one device's version of corresponding data elements. For example, in some implementations, one of the corresponding data elements in the two devices is selected (e.g., by an algorithm, or manually, by a user), and the changes in that version take precedence over and replace the changes in the other version. In other implementations, reconcilable changes in both of the corresponding data elements are applied to yield synchronized corresponding data elements that incorporate changes from both versions of the unsynchronized corresponding data elements.

In some implementations, a synchronization operation is requested by one of two devices being synchronized, and the other device responds to the synchronization request. Synchronization operations can be initiated in response to different triggers. For example, in some implementations, a device can initiate a synchronization operation with another device as soon as a connection is available between the devices (e.g., a wired or wireless connection, as described in greater detail below). In some implementations, a first device can initiate a synchronization operation with a second device as soon data is changed in the first device. In such implementations, if a connection does not exist between the devices, changes to data in the first device can be logged and queued for synchronization at a time when a connection between the devices does exist.

For purposes of the examples that follow, the enterprise computing system 101 can include an enterprise server 137 and one or more user terminals (depicted by a user terminal 140). Various application programs that the user can employ to process different data elements can be provided by either the enterprise server 137, or the user terminal 140, or a combination of the two devices. For example, users can employ an email client running on the enterprise computing system 101 to receive email messages and compose replies and new email messages. As another example, users can employ a file processing application to create, view and edit electronic files on the enterprise computing system 101.

In some implementations, the email messages or electronic files are stored on the enterprise server 137 (e.g., in a storage location depicted by the data store 116), and the user interacts with the email messages or electronic files through the terminal 140. In other implementations, email messages and electronic files are stored on the terminal 140 itself. In some implementations, email messages, electronic files, and other data items stored in the enterprise computing system 101 are available from a cellular network 143, via an adapter network 146.

The smartphone 104 (e.g., a Palm® Treo™) can be configured to send and receive emails; receive and place telephone calls; create, view and edit electronic files; and access voicemails. Cellular service can be provided by the cellular network 143, which, as indicated above, can also provide access to emails, electronic files and other data elements stored on the enterprise computing system 101.

The accessory I/O device 107 can be configured to display output and receive input associated with the smartphone 104. In some implementations, the accessory I/O device 107 provides a larger screen and larger keyboard through which the user can more easily view and enter information on the smartphone 104. In some implementations, the accessory I/O device 107 includes similar resources as a laptop computer (e.g., a microprocessor, memory, persistent storage and various input/output and communication facilities) but the accessory I/O device 107 may be smaller and more portable than a laptop computer. In some implementations, the accessory I/O device 107 does not have cellular communication resources, and thus cannot receive data elements that are stored on the enterprise computing system 101 except through another device (e.g., the smartphone 104).

In some implementations, the stand-alone computing device 110 does not have facilities to directly connect to the enterprise computing system 101 but is otherwise a fully functional computer device having a microprocessor, memory, persistent storage and various input and output capabilities.

The above-described electronic devices and features of the devices are merely exemplary. The reader will appreciate that other variations in the kinds of data that can be processed and the types of devices that process the data are contemplated. For example, digital photos, videos, music files, bookmarks, preferences, and various other kinds of data can be synchronized between devices. Moreover, even if a device is not configured to create or manipulate a particular kind of data, the device may be configured to store that kind of information and pass it to other peer devices. For example, as depicted in one implementation in FIG. 1, the accessory I/O device 107 is not configured to process calendar data elements (as represented by a dashed-line calendar data element 134), but the accessory I/O device 107 may nevertheless be configured to store and synchronize calendar data elements with other peer devices. In particular, in such implementations, the accessory I/O device 107 can be configured to receive calendar data elements from the smartphone 104 or the stand-alone computing device 110 and transmit received calendar data elements to the other device during a synchronization operation—even though the accessory I/O device 107 may not be configured to create or modify calendar data elements.

An example scenario farther illustrates how a user (e.g., a business executive) can employ the various above-described devices to process information. In this example scenario, the business executive works from her employer's office in the early morning; travels to the airport later in the morning to catch a flight to a customer site; flies to the customer site; and works with the customer in the afternoon to solve a problem. Throughout the day, the business executive processes various kinds of information.

From the enterprise terminal 140, the business executive sends and receives emails; accepts appointments and meeting requests; and creates, views and edits various documents and electronic files. At the airport, just before boarding her aircraft, the business executive uses her smartphone 104 to retrieve her emails from the enterprise computing system 101 (e.g., via a synchronization path 146, through the cellular network 143), then synchronizes the retrieved emails and several documents stored on her smartphone 104 with her accessory I/O device 107 (e.g., via a synchronization path 147), before turning off her smartphone 104. From the aircraft, using the accessory I/O device 107, the business executive reads several unread email messages, drafts several replies and new emails, and makes edits to some of the documents stored on the accessory I/O device 107. When the aircraft lands, the business executive powers on her smartphone 104 and synchronizes emails between the smartphone 104 and the accessory I/O device 107 (e.g., via the synchronization path 147), allowing the draft replies and new emails to be sent from the smartphone 104. Later in the day, at the customer site, the business executive transfers documents from the accessory I/O device 107 to the stand-alone computer device 110 (e.g., via a synchronization path 148), from which she edits several of the documents. At the end of the customer visit, the business executive transfers the edited documents from the stand-alone computer device 110 to the accessory I/O device 107 (e.g., via the synchronization path 148), then later to the smartphone 104 (e.g., via the synchronization path 147), from which they are transferred back to the business executive's enterprise computing system 101 (e.g., via the synchronization path 146). Examples of synchronization paths can include hardware, software and communication interfaces that process data that is exchanged between two devices for purposes of synchronization.

Peer-to-peer synchronization can be advantageous in some implementations, such as the scenario described above, since it can allow data to be passed from one device to another device, even if one or both of the devices between which data is being transferred do not have access to a centralized server (e.g., the enterprise server 137). That is, in various implementations, data can be transferred from any peer device to any other peer device.

Peer-to-peer synchronization can include a mode of information transfer by which data elements are transferred between similarly provisioned peer node devices. That is, in some implementations, any peer node device can initiate a transfer of data with any other peer node device; in such implementations, each peer node device can both make data requests of other peer node devices, and receive and service data requests from other devices. In some implementations, a peer-to-peer model of data transfer is distinguished from a client-server model, in which a single server or small number of servers may receive requests for data from various client devices. Such a client-server data transfer model is sometimes described as a hub-and-spoke model, in which each client can exchange data with the server hub through its spoke connection to the server and in which data exchanges between two clients are generally routed through the server hub, rather than performed directly between the clients. The reader will of course appreciate that peer-to-peer synchronization can be provided by a network of devices, some of which are also configured as clients or servers.

Figure 2:
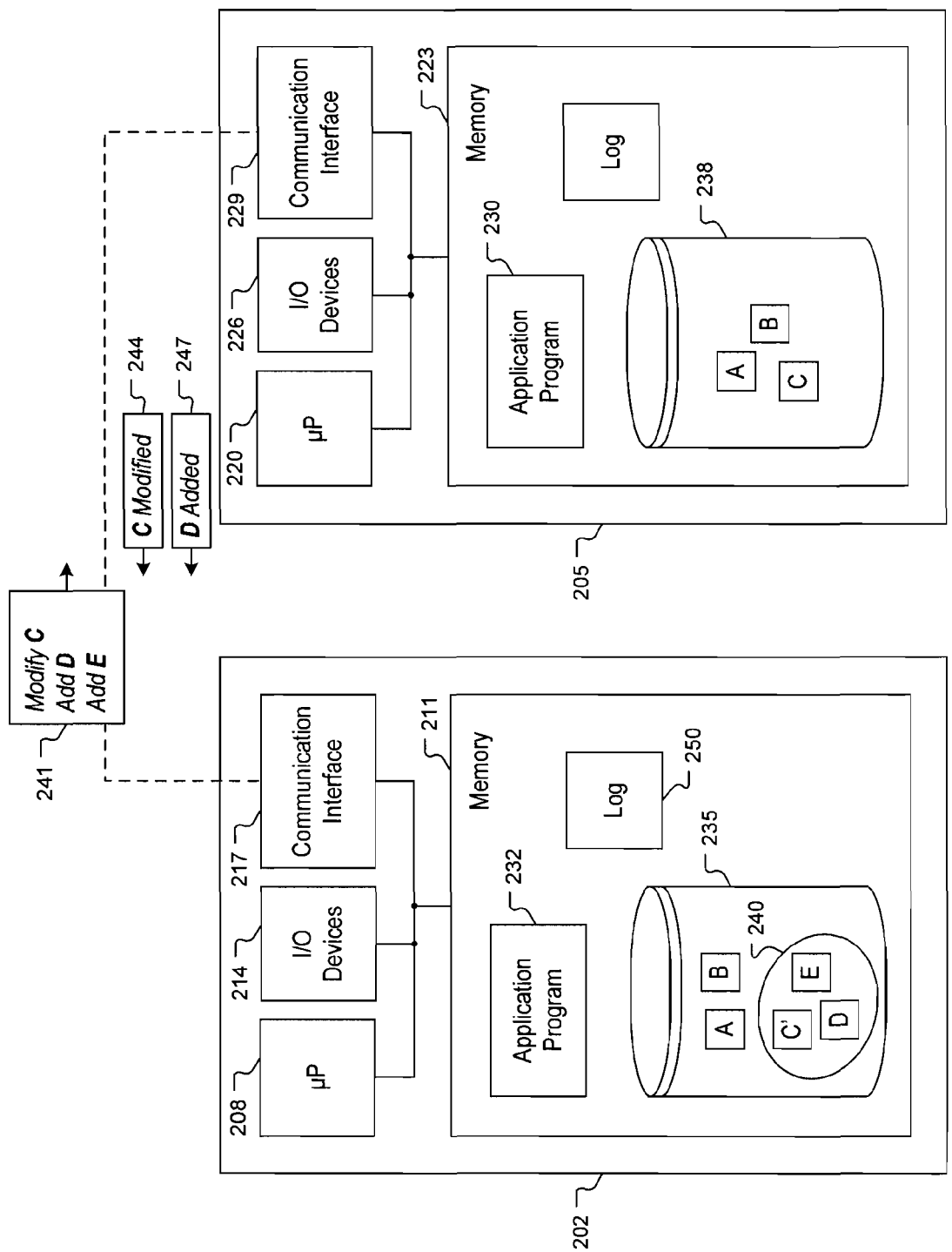
FIG. 2 is a block diagram showing additional details of two example devices.

FIG. 2 is a block diagram showing additional details of two example devices 202 and 205, between which information can be synchronized in a peer-to-peer manner. The example devices 202 and 205 are representative of any of the example devices shown in FIG. 1. As shown, the device 202 includes a microprocessor 208, memory 211, I/O devices 214 and a communication interface 217. The device 205 is shown similarly equipped with a microprocessor 220, memory 223, I/O devices 226 and a communication interface 229.

The microprocessor 208 can execute various programming instructions stored in the memory 211 to perform tasks such as, for example, receiving input from an input device 214 or from the communication interface 217, providing output to an output device 214 or the communication interface 217, or manipulating data stored in memory 211. Suitable processors for the execution of a program of instructions include, by way of example, both general and special purpose microprocessors, and the sole processor or one of multiple processors of any kind of computer.

The memory 211 is shown as a single block, but the memory can include multiple kinds of memory (e.g., RAM, ROM, persistent memory, volatile memory, physical memory, virtual memory, etc.) and can be provided by multiple different devices (e.g., registers within the microprocessor 208, cache chips, RAM chips, magnetic hard drives, optical drives, standalone Flash devices, etc.).

Particular programming instructions stored in the memory 211 can make up application programs, such as the application program 232. Individual application programs can be configured to enable a user to manipulate certain kinds of data, such as email messages, calendar items, electronic files, etc. Moreover, individual application programs can be configured to synchronize data with corresponding applications running on other devices. In some implementations, as depicted in FIG. 2, actual data elements (e.g., individual email messages, calendar items, etc.) can be stored separately from the programming code that makes up the application program(s) used to process the data elements. In particular, FIG. 2 depicts a data store 235 that can store individual data elements A-E, which can be processed by the application program 232.

Only one application program 232 is shown, but the reader will appreciate that multiple application programs can be included in the memory 211. In some implementations, as depicted in FIG. 2, a single application both processes data elements and provides functionality to synchronize the data elements with data elements in another device (e.g., the device 205). In other implementations, many separate application programs perform various discrete functions, such as processing data elements or synchronization the data elements with data elements in other devices.

The data store 235 is shown separately from the application program 232, but in some implementations, the data store is included in an application program. In some implementations, a data store maintains a single kind of data element, such as email messages or calendar items. In other implementations, a single data store can maintain multiple different kinds of data elements.

I/O devices 214 can include a keyboard, mouse or other pointing device, voice input processor, position sensor, display screen, indicator, audio output device, etc., to receive input or provide output to a user. In the implementation that is depicted in FIG. 2, the communications interface 217 can be a special form of I/O device that is configured to transmit and receive information in a digital format with a corresponding communication interface (e.g., communication interface 229) of another device (e.g., device 205).

In some implementations, the communication interface can transmit and receive data in one or more of many different formats, using different media and different data protocols. In some implementations, the communication interface 217 includes, for example, a wired interface, such as a Universal Serial Bus (USB) interface, an IEEE (Institute of Electrical and Electronics Engineers) 1394 "FireWire" or "i.Link" interface, a serial (e.g., RS-232) interface, a fiber interface (e.g., an OC-3, OC-48 or Fibre Channel connection), or a T1 or E1 telecommunications carrier interface. These wired interfaces are merely exemplary, and other wired interfaces are contemplated. In some implementations, the communication interface 217 includes, for example, a wireless interface, such as an IEEE 802.11 Wireless LAN (Local Area Network) interface, an IEEE 802.15 Wireless PAN (Personal Area Network) interface (e.g., a Bluetooth interface), an IEEE 802.16 broadband wireless access ("WiMAX") interface, or an infrared interface characterized by any number of standards provided by the Infrared Data Association (IrDA). These wireless interfaces are merely exemplary, and other wireless interfaces are contemplated.

Through the communication interfaces 217 and 229, data elements can be synchronized between the two devices 202 and 205. In some implementations, synchronizing data elements in the two devices 202 and 205 can include modifying data elements in one or both of the devices (including creating new data elements or deleting existing data elements) such that after the modification or synchronization operation, the data elements in each device store the same underlying information.

In some implementations, two different kinds of synchronization operations can be performed—an exhaustive synchronization operation, and an incremental synchronization operation. An exhaustive synchronization can be performed when a first device that stores several data elements is synchronized with a second device that does not currently store any data elements. Alternatively, an exhaustive synchronization can be performed when data elements in one of the two devices being synchronized have been corrupted. In some implementations, an exhaustive synchronization operation can include copying all data elements in the first device to the second device. Subsequent to an initial exhaustive synchronization operation, an incremental synchronization can be used to update previously synchronized devices. That is, in some implementations, only differential data is sent—that is, data that captures changes to data elements relative to state of the corresponding data stores following a previous synchronization operation.

Either kind of synchronization operation can be interrupted as a result of one or more of various possible error conditions. Example error conditions can include one of the devices losing power (e.g., a low voltage condition in a battery of a mobile device), a communication channel between the devices being broken (e.g., the devices may be outside the range of a wireless connection, a physical connection providing a communication channel may become disconnected, interference may corrupt data on a wired or wireless communication channel, etc.), or an error in execution of programming instructions that perform the synchronization.

In some implementations, synchronization operations that are interrupted before successfully completing are repeated in their entirety. Such a repeat of an entire, partially successful synchronization operation can be costly in the sense that it can consume a significant amount of time and energy (e.g., battery power in a mobile device 202 or 205). The cost of repeating a synchronization operation can be particularly high in the case of an interruption to an exhaustive synchronization operation, since an exhaustive synchronization operation often involves the transfer of more data than an incremental synchronization operation. For example, in some implementations, an exhaustive synchronization operation between a first device and a second (empty) device may include the transfer of hundreds or thousands of data elements, or more, and this transfer of data can take some amount of time; in contrast, a similar incremental synchronization operation may include the transfer of a relatively smaller amount of data (e.g., only tens of data elements).

Accordingly, it can be advantageous for the device 202 or 205 to be configured to permit recovery of a synchronization operation that is interrupted in the middle. One example method that permits recovery from an interruption involves sending multiple changes from a first device to a second device, but receiving and tracking separate acknowledgments for each change that indicate that the corresponding change to a data element has been applied in the second device. In particular, identified changes to data elements in one of a pair of devices being synchronized can be grouped together in a data set, as depicted by the data set 240, and each element in the data set 240 can be processed to implement corresponding changes to the data elements in the second device 205.

In some implementations, changes in the data set 240 can be formatted in a change message that is sent to the second device 205. For example, the first device 202 can generate and send a change message 241 that includes instructions to cause element C in a corresponding data store 238 to be modified and elements D and E to be added to the data store 238. (The reader will appreciate that, in some implementations, each change message will include more information than what is shown in FIG. 2, such as, for example, any information needed to uniquely identify the data element to be changed and information regarding the change itself; in the case of a data element being added, the change instruction would, in some implementations, include the data element itself.)

In some implementations, the receiving device (e.g., device 205) generates and sends an acknowledgement message for each change that is applied. For example, as shown in FIG. 2, an acknowledgement message 244 could be generated to indicate that element C in the data store 238 has been modified, and an acknowledgement message 247 could be generated to indicate that element D has been added to the data store 238. If the synchronization operation is interrupted before all changes identified in the change message 241 have been applied, the synchronization operation for the data set 240 can be subsequently resumed, and only those data elements for which acknowledgements have not been received can be processed. In this manner, changes to data elements can be processed in groups, as depicted by the data set 240, but successful processing of individual data elements within the data set 240 can be tracked, to facilitate recovery of a synchronization operation that is interrupted.

To track the acknowledgement messages, the device 202 can employ a log 250 that tracks all of the changes associated with the data set 240 (i.e., all of the change instructions included in the change message 241) and that further tracks the changes that have successfully been applied in the corresponding device (e.g., device 205), based on the receipt of corresponding acknowledgement messages. An example method of synchronizing sets of data elements is further described with reference to FIG. 3

Figure 3:
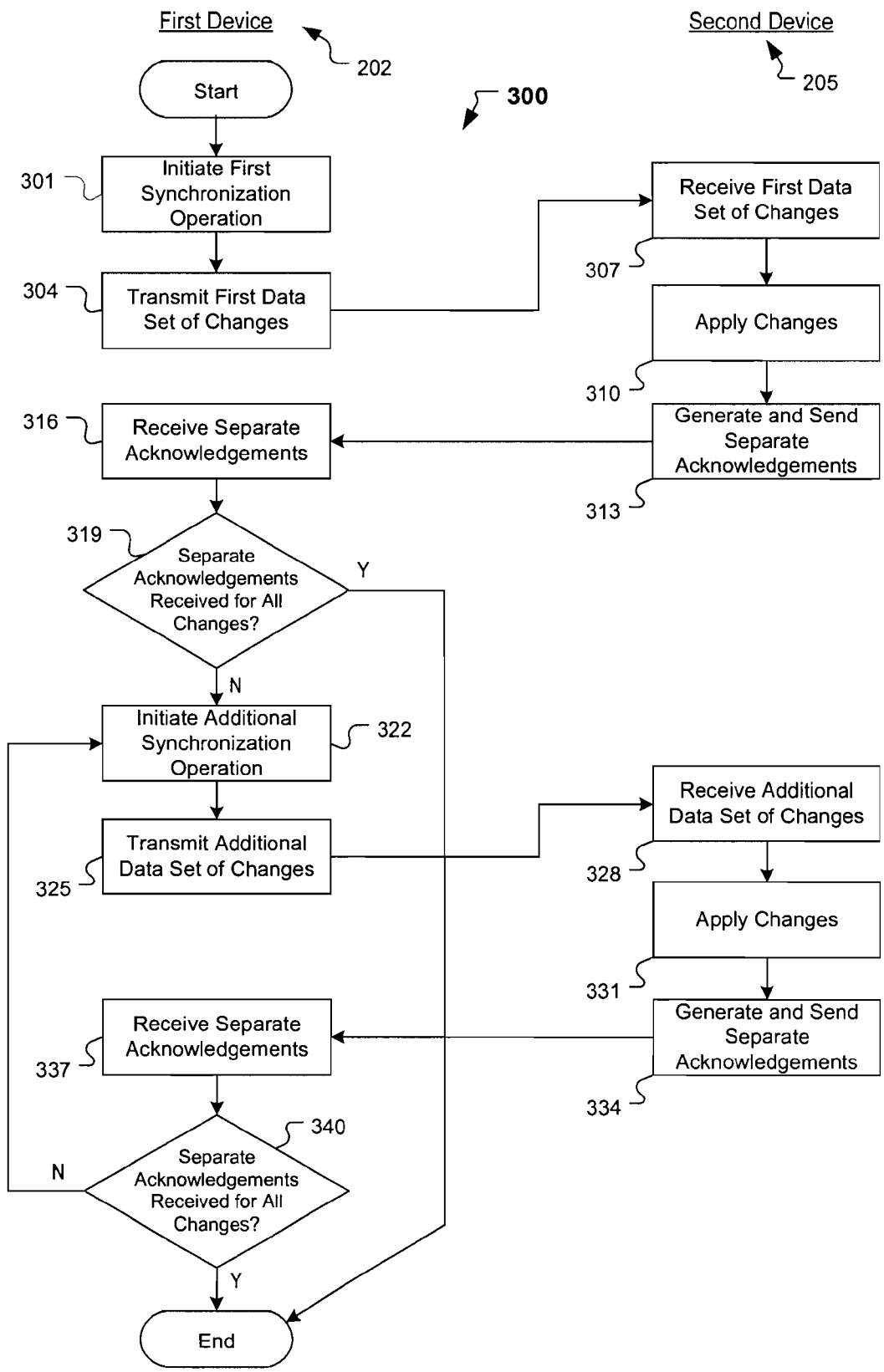
FIG. 3 is a flow diagram illustrating an example method of synchronizing information between two devices.

FIG. 3 illustrates an example method 300 of synchronizing data elements in a first device with corresponding elements in a second device. The method 300 includes actions performed by the first device; other actions are performed by the second device. For purposes of example, the method 300 is described with reference to the first device 202 and second device 205 that are shown in FIG. 2.

In one implementation, as shown, the method 300 includes initiating (301) a first synchronization operation. As a result of the first synchronization operation, changes to data elements in the first device 202 that have been made since a previous successful synchronization between the first device 202 and the second device 205 are applied to the second device 205. For example, as depicted in FIG. 2, the modification of data element C and the addition of data elements D and E can be applied to the second device 205, such that after the synchronization operation, the data elements in the first data store 235 will match the data elements in the second data store 238.

A first data set that includes changes to multiple different data elements is transmitted (304) to the second device. For example, changes to the data elements in the first data store 235 can be identified, grouped in a first data set 240, and transmitted to the second device 205. In particular, for example, in some implementations, the first device 202 generates the change message 241 that includes instructions to apply each identified change to the second device 205, and the first device 202 employs the communication interface 217 to send the change message 241 to the second device 205.

The changes in the data set are received (307) by the second device, the changes are applied (310), and a separate acknowledgement for each change is generated (313) and transmitted (313) back to the first device. For example, the communication interface 229 can receive the change message 241 from the first device 202, and the microprocessor 220 executing programming instructions associated with an application 230 can cause the changes to be applied to the data store 238 (i.e., data elements in the data store 231 can be modified and added based on the change message 241). Subsequently, the microprocessor 220 can cause separate acknowledgements to be generated (313) for each change that is received (307) and applied (310) to the data store 238. The separate acknowledgements (e.g., acknowledgements 244 and 247) can be transmitted (313) by the communication interface 229, and the separate acknowledgements can be received (316) by the communication interface 217 of the first device 202.

The first device 202 can determine (319) if separate acknowledgements have been received (316) for each of the changes in the first data set 240. For example, the microprocessor 208, executing programming instructions associated with the application 232, can determine whether a separate acknowledgement message has been received (316) for each change in the data set 240. If an acknowledgement message has been received (316) for each change, then, in some implementations, the first synchronization operation is complete. If an acknowledgement message has not been received for each change, then, in some implementations, an additional synchronization operation is initiated (322). For example, if only the acknowledgements 244 and 247 have been received by the first device 202 before the first synchronization operation is interrupted, an additional synchronization operation can be initiated to add a data element to the data store 238 that corresponds to data element E in the data store 235 (e.g., for which an acknowledgement was not received during the first synchronization operation, as depicted in FIG. 2).

An additional synchronization operation can include transmitting (325) an additional data set to the second device. In some implementations, the additional data set includes changes to data elements in the first data set 240 (i.e., changes that have been made since a previous, complete, successful synchronization between the first and second devices 202 and 205) for which a separate acknowledgement was not received during the first or previous synchronization operation. Changes in the second data set can again be received (328) and applied (331) by the second device 205, and the second device 205 can generate (334) and send (334) separate acknowledgements for each change, which can be received (337) by the first device 202. Again, a determination can be made (340) as to whether a separate acknowledgement has been received for each change. If a separate acknowledgement has been received for each change, then, in some implementations, the synchronization operation is complete. If a separate acknowledgement has not been received for each change, then additional synchronization operation(s) can be initiated (322) and performed until an acknowledgement has been received for each change.

Figure 4:
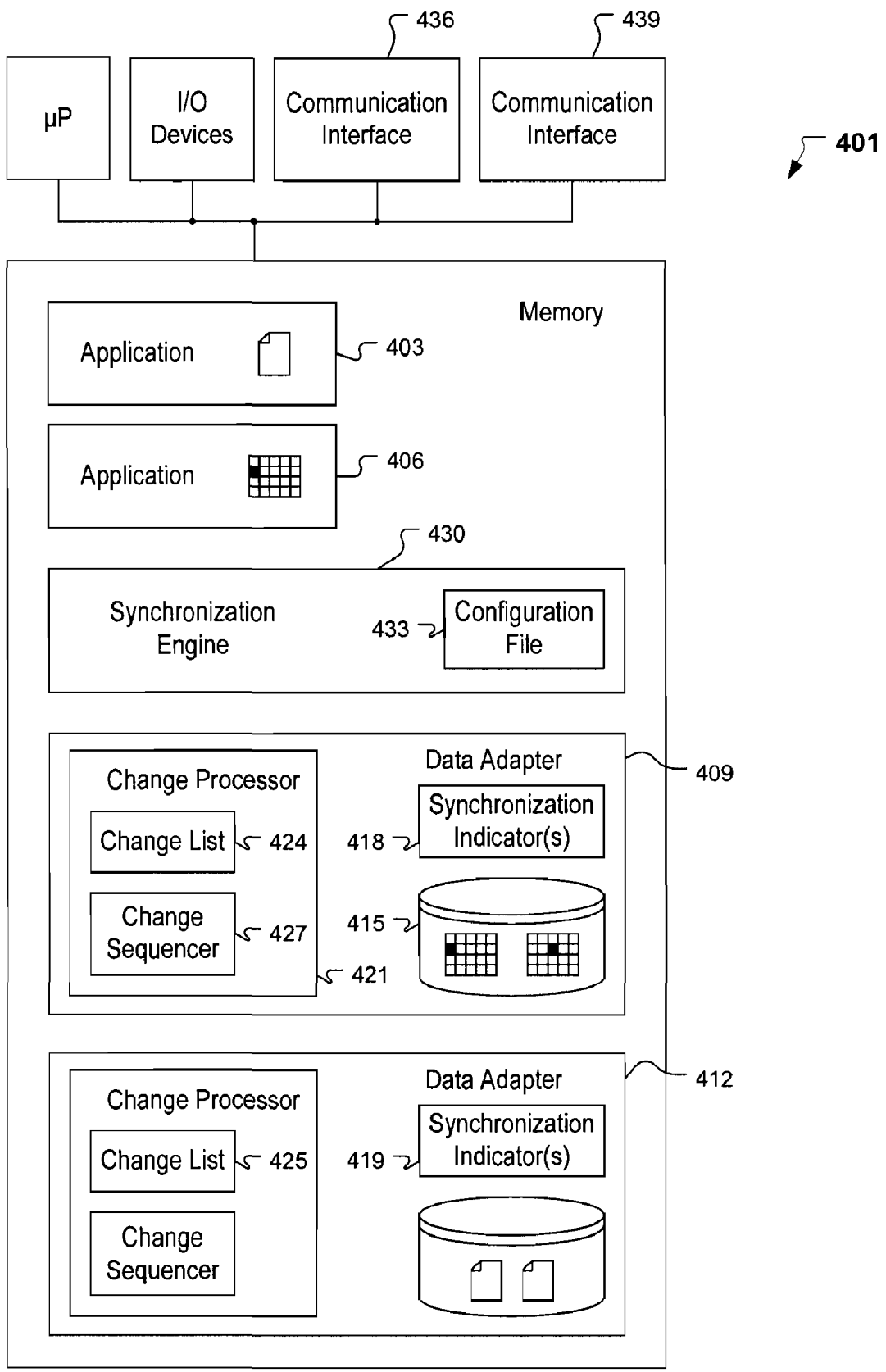
FIG. 4 is a block diagram showing additional details of another example device.

FIG. 4 is a block diagram showing additional details of another example device 401. In some implementations, the device 401 in FIG. 4 is representative of any of the electronic devices that are shown in FIG. 1. As shown in one implementation in FIG. 4, the device 401 includes different applications 403 and 406, each of which can process a different kind of data element. For example, in one implementation, the application 403 processes document data elements, and the application 406 processes calendar data elements. In some implementations, each application or data element type has a corresponding data adapter module 409 and 412 that can provide an interface between the corresponding application and actual data elements that are processed by the applications 403 and 406.

As shown in one implementation in FIG. 4, the data adapter 409 can include a data store 415, synchronization indicators 418, and a change processor 421. In some implementations, the data store 415 maintains a particular kind of data element (e.g., email data elements, voicemail data elements, calendar data elements, etc.). The example data store 415 is depicted as being configured to store calendar data elements. In some implementations, the data adapter 409 employs one or more synchronization indicators 418 at the beginning of a synchronization operation to determine whether any data elements in the data store 415 have changed since a previous synchronization operation. In some implementations, a synchronization indicator can be a time stamp associated with previous synchronization operation, and the data adapter can determine whether any data elements in the data store 415 have changed since the previous synchronization operation by comparing the time stamp of the synchronization indicator with time stamp information associated with a last change to each of the data elements.

In some implementations, synchronization indicators are stored for each device with which the device 401 synchronizes its data. For example, as described above with reference to FIG. 1, the smartphone 104 can synchronize its data with data stored in the I/O accessory device 107 and also with data stored in the enterprise computing system 101. Accordingly, in some implementations, the smartphone 104 can store one synchronization indicator to track synchronization operations with the I/O accessory device 107 and another synchronization indicator to track synchronization operations with the enterprise computing system 101. The appropriate synchronization indicator of multiple synchronization indicators employed by the data adapter 409 can be determined at the time of synchronization, based on the other device or system in the synchronization operation.

In some implementations, a synchronization indicator can have a format other than a time stamp. For example, a synchronization indicator can have any value (e.g., integer, string, real number, table, etc.) from which a corresponding data adapter can determine whether data elements have changed relative to a previous synchronization operation.

In some implementations, two synchronization indicators are used to track whether a set of multiple changes to data elements in a first device's data store has been received and the changes successfully applied to a corresponding data store in the second device. In some implementations, as described in greater detail below, the synchronization indicators can have a null value before two particular devices have been synchronized; the synchronization indicators can have equal values if the two particular devices have been previously synchronized; and the synchronization indicators can have different values if a previous synchronization operation was initiated but interrupted before completing successfully.

In some implementations, similar synchronization indicators can be maintained by each device, and comparison of two synchronization indicators during a synchronization operation between a first device and a second device can include comparison of one synchronization indicator that is maintained by the first device with a second synchronization indicator that is maintained by the second device. For example, in some implementations, a first device that initiates a synchronization operation can send to a corresponding second device that responds to the initiation of the synchronization operation one or more synchronization indicators that it maintains; the second device can receive the one or more synchronization indicators from the first device; and the second device can compare one or more of the received indicators with one or more indicators that the second device stores. In this manner, in some implementations, a device that is responding to an initiation of a synchronization operation can determine whether a previous synchronization operation was interrupted and can identify appropriate data elements that have changed since an earlier synchronization operation (e.g., in a second phase of a synchronization operation).

To provide indications of the existence and success or failure of a previous synchronization operation, the two synchronization indicators can be updated, in some implementations, in a manner that is now described. A first synchronization indicator can be used to store a time stamp or other value associated with a previous synchronization; a second synchronization indicator can be used to store a time stamp or other value associated with a current synchronization operation that is being initiated, assuming the current synchronization operation is successful (e.g., a current time stamp). When a new synchronization operation is initiated, the two synchronization indicators can be analyzed.

In some implementations, if the two synchronization indicators have null values, no previous synchronization operation is deemed to have occurred, and one of the synchronization indicators can be set to a current value (e.g., a current time stamp). If the two synchronization indicators have the same value, a previous synchronization can be deemed to have occurred successfully, and one of the synchronization indicators can be set to a current value (e.g., a current time stamp). Subsequently, if the current synchronization operation completes successfully, the synchronization indicator that was not previously set to the current value can be set to the current value (resulting in two synchronization indicators with the same, new value). If the two synchronization indicators have different, non-null values, a previous synchronization operation can be deemed to have been initiated but not completed successfully. In such cases, the previous unsuccessful operation can be resumed, using, for example, a change processor, which is now described.

As shown in FIG. 4, the data adapter 409 includes a change processor 421, which, in the implementation shown, includes a change list 424 and a change list sequencer 427. In some implementations, the change processor 421 tracks changes to individual data elements that have occurred since a previous synchronization. In some implementations, the change processor 421 can use the synchronization indicators 418 to identify such changed data elements. For example, in implementations in which the synchronization indicators provide time stamp information associated with a previous synchronization operation, the change processor 421 can identify data elements that have been modified since a previous synchronization operation based, for example, on time stamps associated with each data element (e.g., a time stamp associated with the most recent change to the data element).

In some implementations, the change processor 421 can employ a synchronization counter (not shown) to identify data elements that have changed. For example, a synchronization counter can be incremented each time a data element is changed or a synchronization operation is successfully completed between data elements in a corresponding data adapter (e.g., data adapter 409) and data elements in another device. When a data element is changed, an identifier associated with the data element can be added to the change list 424, along with a current value of the synchronization counter. Similarly, when a synchronization operation successfully completes, the operation can also be logged (e.g., in the change list 424 or in another data structure), along with a current value of the synchronization counter. Subsequently, when a synchronization operation is initiated, the change processor can compare stored synchronization counter values associated with data identifiers in the change list 421 with a stored synchronization counter value corresponding to the previous synchronization operation. In some implementations, if the counter value associated with a specific data element is higher than the counter value associated with a previous synchronization operation, the specific data element can be synchronized; conversely, if the counter value associated with the specific data element is less than or equal to a counter value associated with the previous synchronization operation, the specific data element can be deemed to have already been appropriately synchronized, and no further action may be necessary for this specific data element during a synchronization operation.

In some implementations, use of counter values can efficiently facilitate synchronization between devices that have different time references, or devices whose users have manually adjusted a corresponding time reference. The reader will appreciate that time stamps and counter values are examples of two resources that a device can employ to identify data elements that have changed since a previous synchronization operation. Other resources and methods can be employed, and other variations to the example resources and methods are contemplated. For example, a synchronization counter can be incremented or decremented. In some implementations, a synchronization counter is advanced (e.g., incremented or decremented) only following a synchronization operation; in these implementations, multiple data elements may be associated with the same synchronization counter value.

In some implementations, the change list sequencer 427 is employed in conjunction with a synchronization engine 430 to ensure that each change that is stored in the change list 424 is applied to data elements in a corresponding device with which the device 401 is synchronizing. The synchronization engine 430 can be configured to generically handle synchronization of different kinds of data elements (e.g., data elements from multiple different data adapters, such as the data adapters 409 and 412). In some implementations, the synchronization engine 430 can track which types of data elements have been synchronized with various other devices. For example, with reference to FIG. 1, the synchronization engine 430 can track whether email messages in the accessory I/O device 107 have been synchronized with emails in the smartphone 104, or whether documents in the accessory I/O device 107 have been synchronized with documents in the stand-alone computing device 110.

In some implementations, the synchronization engine 430 employs a configuration file 433 to track which data elements have been synchronized with data elements in other devices. In some implementations, the configuration file 433 stores a separate set of synchronization indicators, which may have a similar format as the synchronization indicators that are stored in each data adapter, as described above. Although such implementations duplicate some synchronization information, the duplication of information can facilitate a finer granularity of control over the synchronization operation than may be otherwise possible. For example, devices that maintain synchronization indicators in both a configuration file associated with the synchronization engine and in individual data adapters can synchronize certain data elements (e.g., email data elements) while selectively not synchronizing other data elements (e.g., calendar data elements). In other implementations, the configuration file 433 does not store a separate set of synchronization indicators, and synchronization tracking is handled at the data adapter level.

The synchronization engine 430 can send and receive messages to and from a synchronization engine in a corresponding device. To do so, the synchronization engine 430 can operate in conjunction with one of the data adapter's change processors (e.g., change processor 421) to identify changes that should be applied to data elements in the corresponding device based on data elements in the device 401 that have changed since a previous synchronization. Once the synchronization engine 430 and appropriate change processor (e.g., change processor 421) have identified changes, the synchronization engine 430 can generate an appropriately formatted change message with a group of identified changes, and transmit the message, via an appropriate communication interface (e.g., communication interface 439). The synchronization engine 430 can also receive synchronization messages, decode their contents and interact with an appropriate data adaptor to apply the changes to appropriate data elements.

The synchronization engine 430 can also generate and receive acknowledgements to indicate that specific changes have been applied. In some implementations, the acknowledgements are passed to an appropriate data adapter (e.g., the data adapter 409), and the data adapter can track the acknowledgements, for example, in its change list (e.g., change list 424). Example change lists are illustrated in and described below with reference to FIG. 5.

As shown in one implementation in FIG. 4, the device 401 includes two communication interfaces 436 and 439. A device can have more or less than two communication interfaces. In implementations having multiple communication interfaces, each communication interface can implement a different type of communication. For example, in one implementation, the communication interface 436 may be a radio interface that can be employed to communicate, for example, with a cellular network (e.g., the network 143, shown in FIG. 1), and the communication interface 439 may be another, different radio interface, such as a Bluetooth interface.

In some implementations, the device 401 employs one communication interface to exchange data with certain devices, and the device 401 employs another communication interface to exchange data with other devices. In particular, for example, with reference to FIG. 1, the device 401 may employ the communication interface 436 to exchange data with the enterprise computing system 101, via the cellular network 143; and the device 401 may employ the interface 439 to exchange data with the accessory I/O device 107.

Multiple communication interfaces can implement different communication protocols or the same communication protocol, and the communication interfaces and protocols implemented can depend on the device itself. For example, with reference to FIG. 1, the enterprise computing system 101 can employ a wired USB interface via the enterprise terminal 140, and a wireless CDMA interface via the cellular network 143. As additional examples, the smartphone 104 can employ a wireless CDMA interface and a wireless Bluetooth interface, and the accessory I/O device 107 can employ a wireless Bluetooth interface and a wired IEEE 1394 interface. The interfaces described above are merely exemplary, and the reader will appreciate that any kind of data interface can be employed by the device to transfer data from one device to another device, or to synchronize data with the other device.

In some implementations, the device 401 has a modular design, in which different software applications, modules and protocols can be employed to implement different components. For example, some implementations adopt a layered approach to software or hardware design, where each layer has its own protocol or format it uses to communicate to a corresponding layer in another device. In particular, each layer, starting with an application layer and working down to lower-level protocols at a physical layer, can have its own communication protocol that abstracts the details of lower-level protocols.

To implement such a layered approach, each layer can be handled by different software or hardware modules. For example, the application 403 can comprise one software module, the synchronization engine 430 can comprise another module, each data adapter 409 or 412 can comprise another module, and each communication interface 436 or 439 can comprise another module. Such modularization can, in some implementations, yield efficiencies by facilitating reuse of various software modules. Moreover, such modularization can be based on whether corresponding functions are device-specific (e.g., specific to particular hardware or software components in the device 401) or device-independent. In some implementations, certain modules can be pre-optimized and pre-compiled software modules provided by third parties. For example, in some implementations, at least a portion of the synchronization engine can be implemented by a SyncML component (Synchronization Markup Language—a platform-independent information synchronization standard), and can accordingly adopt a SyncML protocol of data exchange. In such implementations, the two synchronization indicators described above can be derived from either or both of a "next anchor" and a "last anchor" that are described in various specifications associated with SyncML Components other than the synchronization engine 430 can also exchange data according to specific, possibly layered, protocols. For example, in some implementations, applications in one device can exchange data with applications in another device using WBXML (WAP (Wireless Application Protocol—an international standard for wireless communications) Binary XML (eXtensible Markup Language—a general purpose markup language)), which is a binary representation of XML that can be used to compactly transfer files over mobile networks. Software modules at transport or network levels (e.g., according to the Open Systems Interconnection (OSI) basic reference model of communications) may employ HTTP, or TCP, over IP. Data and physical layers may employ appropriate protocols for specific communication interfaces (e.g., CDMA, Bluetooth, IrDA, etc.). The above-described protocols are merely exemplary; any suitable protocol can be employed to facilitate synchronization of data between devices, and various layers of protocols can be employed based on any layering of components that perform synchronization of data between various applications. Moreover, the above description assumes software-based modules, but in some implementations, hardware-based modules can be used in place of or in addition to software-based modules.

Figure 5:
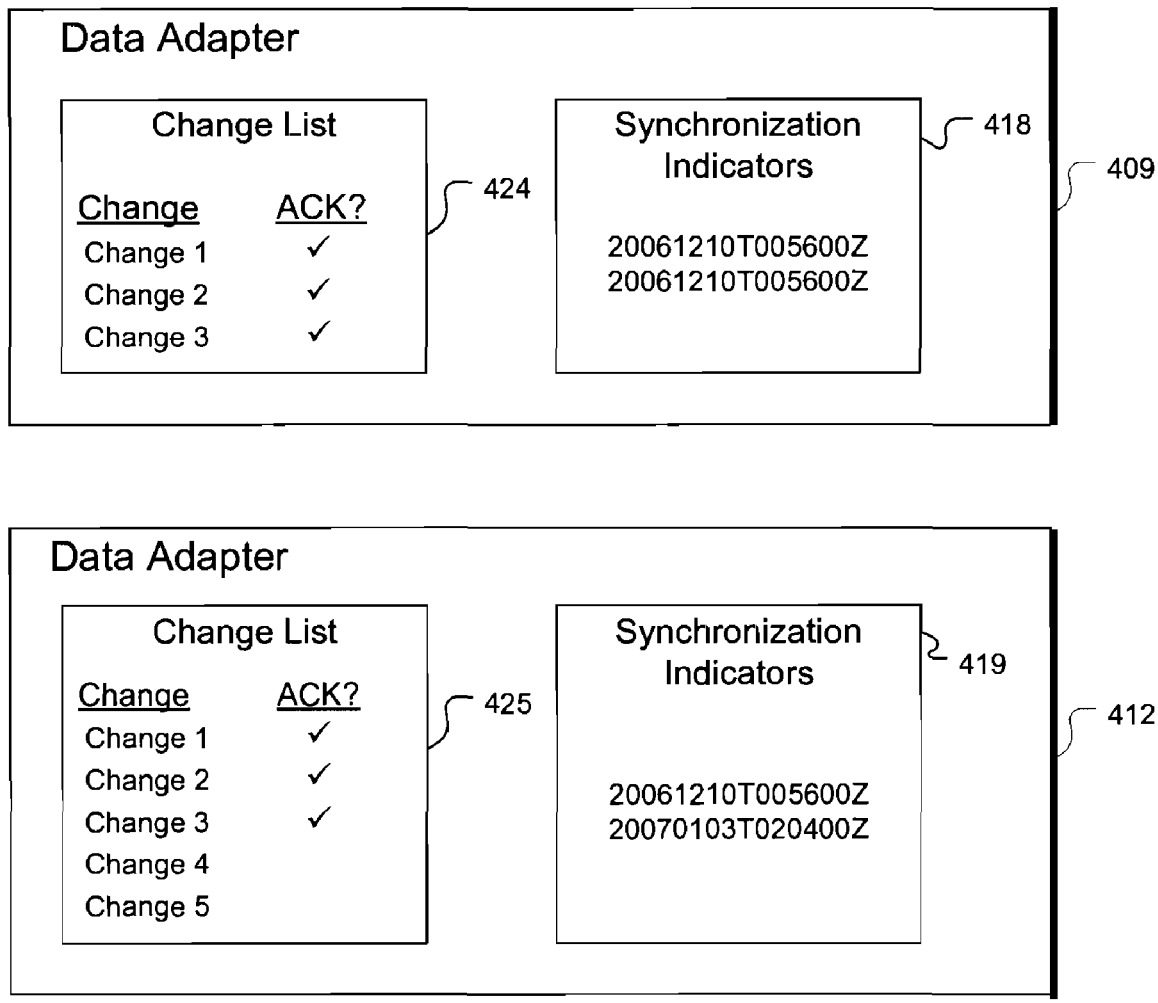
FIG. 5 is a block diagram showing additional details of the example device that is shown in FIG. 4.

FIG. 5 is a block diagram showing additional example details of the device that is shown in FIG. 4. In particular, FIG. 5 illustrates example synchronization indicators 418 and 419 and change lists 424 and 425 in the data adapters 409 and 412. As shown in one implementation, two time stamp-based indicators 418 can facilitate a determination that data elements in the data adapter 409 were successfully synchronized with data elements in another device at the date and time specified by the matching time stamps (e.g., Dec. 10, 2006, at 12:56 AM). As shown in the change list 424, an acknowledgement flag (depicted by a check mark) has been set for each of three changes that were identified for application to the other device. In some implementations (not shown), the change list is cleared after a successful synchronization operation.

Also shown in one implementation are two time stamp indicators 419 that can facilitate a determination that data elements in the data adapter 412 were not successfully synchronized in a previous synchronization operation. In some implementations, because the time stamp values are different (e.g., Dec. 10, 2006, at 12:56 AM, and Jan. 3, 2007, at 2:04 AM), the data adapter 412 can determine that a previous synchronization operation was initiated but not successfully completed. The data adapter 412 can retrieve the change list 425 and determine that "Change 1," "Change 2" and "Change 3" have been acknowledged as applied in a corresponding device with which the device 401 was synchronizing (e.g., based on the set state of corresponding acknowledgement flags, as depicted by the corresponding check marks), but that "Change 4" and "Change 5" have not been acknowledged as applied (e.g., based on the cleared state of corresponding acknowledgement flags, as depicted by the absence of corresponding check marks). Accordingly, the synchronization engine 430 (shown in FIG. 4) can initiate a second synchronization operation in which "Change 4" and "Change 5" are provided to be applied to data elements in the corresponding device. In this scenario, upon receipt of acknowledgements that "Change 4" and "Change 5" have been applied, appropriate acknowledgement flags can be set (e.g., the "ACK?" column of the change list 425 can be updated) to reflect the new acknowledgements, and the synchronization indicators 419 can be updated (e.g., such that both synchronization indicators are set to "20070103T020400Z," indicating, for example, a successful synchronization of data as of Jan. 3, 2007, at 2:04 AM).

Figure 6:
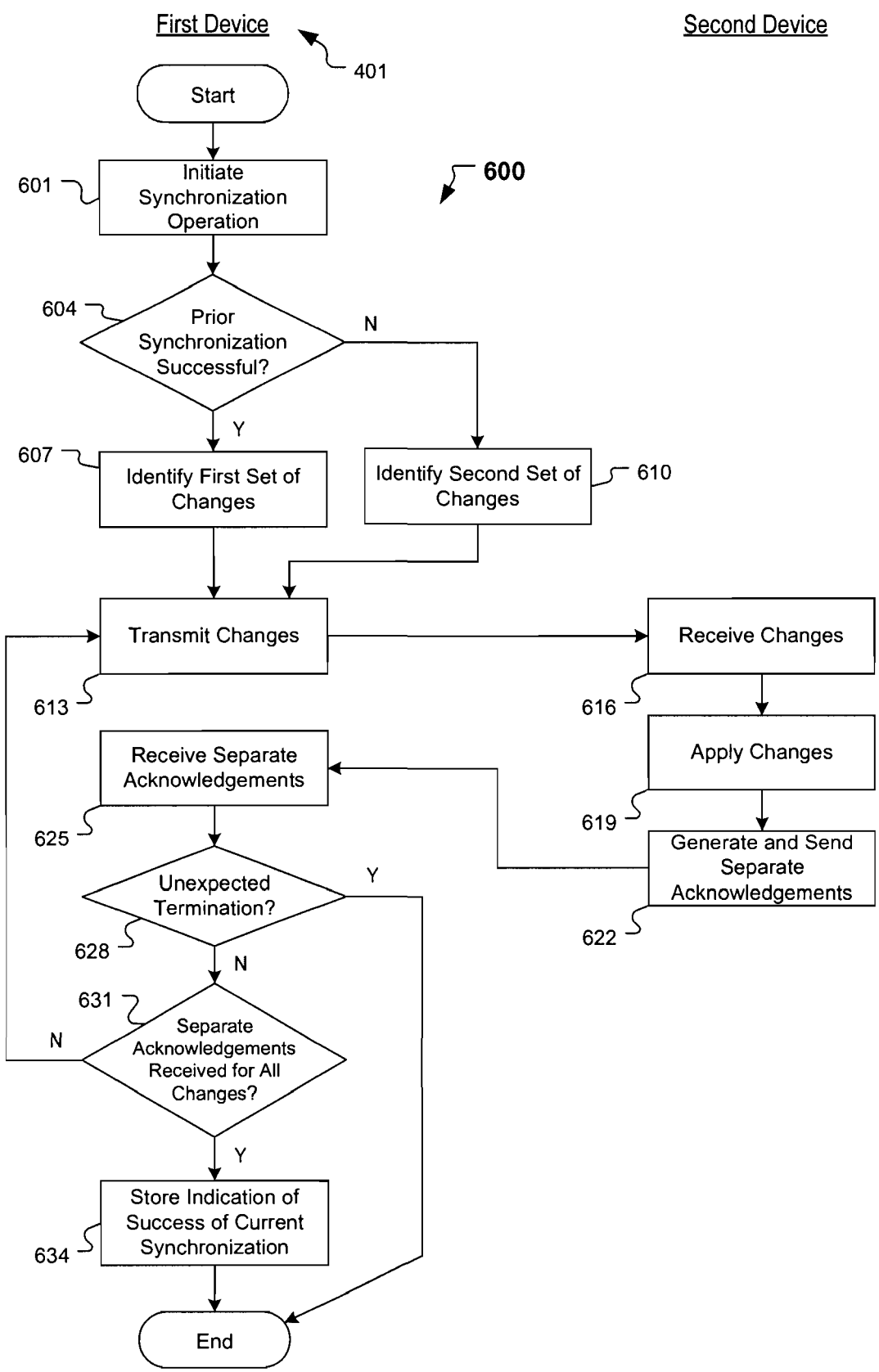
FIG. 6 is a flow diagram of another example method for synchronizing information between two devices.

FIG. 6 illustrates another example method 600 of synchronizing data elements in a first device with corresponding elements in a second device. The method 600 includes actions performed by the first device; other actions are performed by a second device. For purposes of example, the method 600 is described with reference to a first device 401, shown in FIG. 4, and a second device.

In one implementation, as shown, the method 600 includes initiating (601) a synchronization operation. For example, with reference to FIG. 4, the device 401 can initiate a synchronization operation with a second device. In particular, an application running on the device 401, such as the application 406, can initiate synchronization of data elements (e.g., calendar data elements) that are processed by the application 406 with corresponding data elements in the second device.

The method 600 includes determining (604) whether a prior synchronization operation was successful. For example, the synchronization engine 430 or data adapter 409 can retrieve one or more synchronization indicators 418 and determine, based on corresponding value(s), whether a previous synchronization operation was initiated, and if so, whether it completed successfully. In particular, in implementations in which two synchronization indicators 418 are employed, the synchronization engine 430 or data adapter 409 can determine whether the synchronization indicators are null (e.g., indicating that no previous synchronization operation was performed), and if the synchronization indicators are not null, whether their values are equal (e.g., indicating that a previous synchronization operation was successful) or not equal (e.g., indicating that a previous synchronization operation was interrupted).

If a previous synchronization operation is determined (604) to have been successful, a first set of changes can be identified (607). The first set of changes can include all changes to data elements that have been made since the previous, successful synchronization operation. If the previous synchronization operation is determined (604) to have been unsuccessful (e.g., interrupted before completing successfully), a second set of changes can be identified (610). In some implementations, the second set of changes includes all changes to data elements that have been made since an earlier, successful synchronization operation for which separate acknowledgements were not received in the previous, unsuccessful synchronization operation. In either case, the first or second set of changes can, in some implementations, be identified by the change processor 421, and can be tracked in the change list 424.

Once identified, either the first set or second set of changes can be transmitted (613) to the second device. In particular, for example, the synchronization engine 430 can generate a change message that includes a change instruction for each of the changes identified in either the first or second set, and the change message can be transmitted (613) to the second device via the communication interface 439.

The changes in the first or second data set can be received (616) by the second device, applied (619), and a separate acknowledgement for each change can be generated (622) and transmitted (622) back to the first device 401, which can receive (625) the separate acknowledgements.

If the synchronization operation is not unexpectedly terminated (depicted by the 'Y' path of a decision box 628), the first device 401 can determine (631) if separate acknowledgements have been received (625) for each of the changes in either the first set or the second set. For example, as separate acknowledgement messages are received (625), the corresponding acknowledgements can be logged in the change list 424 (as indicated above, acknowledgements are depicted by check marks in FIG. 5). In particular, after each acknowledgement is received, the change processor 421 can query the change list 424 to determine (631) if an acknowledgement has been logged for each change in the change list.

If it is determined (631) that a separate acknowledgement has been received (625) for each change in the first or second data set (whichever is appropriate, based on the actions 607 or 610 described above), the device 401 can store (634) an indication of success of the current synchronization operation. For example, in some implementations, the corresponding data adapter (e.g., data adapter 409) can update the synchronization indicators 418. In particular, in implementations in which the device 401 maintains two synchronization indicators, as depicted in FIG. 5 (e.g., a previous time stamp and a current time stamp), the synchronization indicators can be set to both store the most recent value (e.g., a current time stamp).

During a subsequent synchronization operation, the data adapter 409 can initially retrieve the values of the synchronization indicators 418, determine that the values match, and thereby determine (604) that a previous synchronization operation was successful. A first set of changes can be identified (607) for the subsequent synchronization operation, where the first set of changes includes changes to data elements that have occurred since the synchronization operation described above completed successfully.

In implementations in which a synchronization operation unexpectedly terminates, an indication of success is not stored (634), and during a subsequent synchronization operation, the data adapter 409 will be able to determine (604) this. For example, in some implementations, two synchronization indicators will have different values. Accordingly, a second set of changes can be identified (610) for the subsequent (e.g., resumed) synchronization operation, where the second set of changes includes changes to data elements that have occurred since an earlier, successfully completed synchronization operation, but for which separate acknowledgements were not received in the previous, unsuccessful synchronization operation (e.g., "Change 4" and "Change 5" in the change list 425, shown in FIG. 5).

In the manner described above, a device can synchronize, in batches, its data elements with data elements in another device. Moreover, individual data elements within a batch can be separately acknowledged, such that an unexpectedly interrupted synchronization operation can be resumed. In implementations that employ a modular design approach, with various layers of modules and protocols as described above, such a synchronization operation can facilitate the use of standard protocols (e.g., WBXML, HTTP, SyncML, etc.), but provide features to resume an unexpectedly interrupted synchronization operation that may not otherwise be feasible with standard protocols and modules.

A number of implementations have been described. Nevertheless, it will be understood that various modifications may be made without departing from the spirit and scope of the described implementations. Accordingly, other implementations are within the scope of the following claims:

What is claimed is:

1. A method of synchronizing data between two devices, the method comprising:
  starting, in a first device, a first synchronization operation comprising transmitting a first data set to be received by a second device, the first data set comprising changes to multiple different data elements in the first device that have occurred since a prior successful synchronization operation between the first device and the second device;
  receiving, during the first synchronization operation, at least one of separate acknowledgements for each of the multiple different data elements, each such acknowledgement indicating that a change to one of the multiple different data elements in the first device has been applied to a corresponding data element in the second device; and
  when the first synchronization operation is interrupted and a separate acknowledgment has not been received for each of the multiple different data elements, initiating a second synchronization operation comprising transmitting a second data set to be received by the second device, the second data set comprising the changes to the multiple different data elements of the first data set for which a separate acknowledgement was not received during the first synchronization operation; and further comprising generating a change list having a change instruction for each change in the first data set; and further comprising setting a flag corresponding to each change instruction for which a corresponding separate acknowledgment has been received; and further comprising generating the second data set, wherein generating the second data set comprises identifying one or more change instructions in the change list for which a corresponding log entry has not been generated.

* * * * *